US010169921B2

(12) United States Patent
Jayaraj et al.

(10) Patent No.: US 10,169,921 B2
(45) Date of Patent: Jan. 1, 2019

(54) SYSTEMS AND METHODS FOR AUGMENTED REALITY AWARE CONTENTS

(71) Applicant: Wipro Limited, Banglore (IN)

(72) Inventors: Ragupathy Jayaraj, Bangalore (IN); Mukesh Manjunath Prabhu, Bangalore (IN)

(73) Assignee: Wipro Limited, Bangalore (IN)

( * ) Notice: Subject to any disclaimer, the term of this patent is extended or adjusted under 35 U.S.C. 154(b) by 66 days.

(21) Appl. No.: 15/275,709

(22) Filed: Sep. 26, 2016

(65) Prior Publication Data

US 2018/0040166 A1    Feb. 8, 2018

(30) Foreign Application Priority Data

Aug. 3, 2016   (IN) .............................. 201641026534

(51) Int. Cl.
*G06T 19/00*    (2011.01)
*G06F 3/00*     (2006.01)
(Continued)

(52) U.S. Cl.
CPC ............ *G06T 19/006* (2013.01); *G06F 3/005* (2013.01); *G06F 3/011* (2013.01); *G06F 17/30* (2013.01);
(Continued)

(58) Field of Classification Search
CPC .............................. G06T 19/006; G06T 19/00
(Continued)

(56) References Cited

U.S. PATENT DOCUMENTS

2008/0270934 A1   10/2008   Firebaugh et al.
2012/0144169 A1 *  6/2012   Isaka .................. G06T 1/20
                                                  712/220
(Continued)

FOREIGN PATENT DOCUMENTS

CN    101976563 A    2/2011
CN    102110379 A    6/2011
(Continued)

OTHER PUBLICATIONS

European International Search Report issued in the European Patent Office in counterpart European Application No. 16196190.9, dated May 3, 2017, 9 pages.
(Continued)

*Primary Examiner* — Jin Ge
(74) *Attorney, Agent, or Firm* — Finnegan, Henderson, Farabow, Garrett & Dunner L.L.P.

(57) ABSTRACT

Methods and systems for rendering augmented reality aware standard digital content are disclosed. The method includes detecting a context sensitive trigger initiated in response to activation of a trigger condition related to a standard digital content; determining augmented reality content information associated with the context sensitive trigger using augmented reality awareness data; retrieving based on the augmented reality content information, at least one of augmented reality trigger information, augmented reality digital content or mixed content experience configuration; activating at least one reality source based on the context sensitive trigger to capture reality data in response to retrieving; identifying at least one augmented reality trigger in the at least one reality source; and selectively rendering one of the at least one portion of the standard digital content, the augmented reality digital content and the reality data relative to the at least one portion of the standard digital content.

18 Claims, 5 Drawing Sheets

(51) Int. Cl.
*H04N 7/18* (2006.01)
*G06F 17/30* (2006.01)
*G06F 3/01* (2006.01)

(52) U.S. Cl.
CPC ......... *H04N 7/188* (2013.01); *G06T 2200/16* (2013.01)

(58) Field of Classification Search
USPC ........................................................ 345/633
See application file for complete search history.

(56) References Cited

U.S. PATENT DOCUMENTS

| | | | |
|---|---|---|---|
| 2012/0263154 A1* | 10/2012 | Blanchflower ... | G06F 17/30247 370/338 |
| 2013/0094682 A1 | 4/2013 | Lee et al. | |
| 2013/0162676 A1* | 6/2013 | Taylor ..................... | G06T 7/004 345/633 |
| 2013/0321390 A1 | 12/2013 | Latta et al. | |
| 2014/0173441 A1 | 6/2014 | Venugopal et al. | |
| 2014/0210710 A1* | 7/2014 | Shin ........................ | G06T 11/60 345/156 |
| 2014/0225924 A1* | 8/2014 | Loxam .................. | G06T 19/006 345/633 |
| 2014/0253743 A1* | 9/2014 | Loxam .................. | H04N 5/232 348/207.1 |
| 2015/0235267 A1 | 8/2015 | Steube et al. | |
| 2015/0302651 A1* | 10/2015 | Shpigelman .......... | G06T 19/006 345/633 |
| 2016/0112479 A1* | 4/2016 | Jayaraj .................. | G06T 19/006 345/633 |
| 2017/0046879 A1* | 2/2017 | Severn ................ | H04N 5/23293 |

FOREIGN PATENT DOCUMENTS

| | | |
|---|---|---|
| CN | 101114303 B | 6/2012 |
| CN | 102509484 A | 6/2012 |
| CN | 202331859 U | 7/2012 |
| CN | 102853900 A | 1/2013 |
| CN | 103970409 A | 8/2014 |
| CN | 104992205 A | 10/2015 |
| EP | 2 626 118 A3 | 8/2013 |
| EP | 2 626 834 A2 | 8/2013 |
| EP | 2 626 834 A3 | 8/2013 |
| JP | 2011-253512 A | 12/2011 |
| WO | WO 2013/085320 A1 | 6/2013 |
| WO | WO 2013/117977 A3 | 8/2013 |
| WO | WO 2015/031886 A1 | 3/2015 |
| WO | WO 2015/167515 | 11/2015 |

OTHER PUBLICATIONS http://www.marxentlabs.com/5-augmented-reality-books-that-delight-and-engage/, 3 pages.
http://www.sun-sentinel.com/business/consumer/fi-augmented-reality-book-20150701-story.html, "Children's Book Augmented Reality", 2 pages.
https://www.researchgate.net/publication/261464588_Development_of_an_interactive_book_with_Augmented_Reality_for_mobile_learningm Ana Grasielle Dionisio Correa, et al., "Development of an interactive book with Augmented Reality for mobile learning", Jan. 2013, *ResearchGate*, pp. 1-18.

* cited by examiner

SYSTEMS AND METHODS FOR AUGMENTED REALITY AWARE CONTENTS

TECHNICAL FIELD

This disclosure relates generally to augmented reality and more particularly to systems and methods for augmented reality aware contents.

BACKGROUND

Augmented reality is a context aware content presentation technology that is used to provide situation related assistance. Standard digital content is any type of content that exists in the form of digital data and is rendered by standard rendering tools that support the particular content type. Mixed content experience is the merging of augmented reality and standard digital contents to produce new dynamic experience and visualizations where they co-exist and interact in real time.

In one of the conventional augmented reality tool, augmented reality technology is used to overlay wireframes, icons, and texts onto the real world view. Similarly, augmented reality tools try to augment reality with existing standard digital content. However, in this augmented reality tool, the standard digital content is completely converted into augmented reality based digital content. This process is time, effort, and cost intensive as additional augmented reality content is required.

The above cited problem is addressed in another conventional augmented reality tool that provides a mechanism for inserting immersive contents into eBook for providing augmented reality experience for e-book user. However, this mechanism works only for e-books and has a limitation of using widget based augmented reality only and fails to work with other standard digital content. Moreover, this augmented reality tool uses only camera (and media frames) as reality source and input.

SUMMARY

In one embodiment, a method of rendering augmented reality aware standard digital content is disclosed. The method includes detecting, by a user device, a context sensitive trigger initiated in response to activation of a trigger condition related to a standard digital content; determining augmented reality content information associated with the context sensitive trigger using augmented reality awareness data; retrieving based on rendering capability of the user device and augmented reality content information, at least one of augmented reality trigger information, augmented reality digital content associated with the augmented reality trigger information or mixed content experience configuration; activating at least one reality source based on the context sensitive trigger to capture reality data in response to retrieving the augmented reality content information, the augmented reality trigger information, and the mixed content experience configuration; identifying, by the user device, at least one augmented reality trigger in the at least one reality source, when the rendering capability of the user device comprises ability to identify augmented reality triggers in reality sources; and selectively rendering, by the user device, one of the at least one portion of the standard digital content, the augmented reality digital content or the reality data captured by the at least one reality source relative to the at least one portion of the standard digital content, based on the rendering capability of the user device and the mixed content experience configuration.

In another embodiment, a system for rendering augmented reality aware standard digital content is disclosed. The system includes at least one processors and a computer-readable medium. The computer-readable medium stores instructions that, when executed by the at least one processor, cause the at least one processor to perform operations that include detecting a context sensitive trigger initiated in response to activation of a trigger condition related to a standard digital content; determining augmented reality content information associated with the context sensitive trigger using augmented reality awareness data; retrieving based on rendering capability of the user device and augmented reality content information, at least one of augmented reality trigger information, augmented reality digital content associated with the augmented reality trigger information or mixed content experience configuration; activating at least one reality source based on the context sensitive trigger to capture reality data in response to retrieving the augmented reality content information, the augmented reality trigger information, and the mixed content experience configuration; identifying at least one augmented reality trigger in the at least one reality source, when the rendering capability of the user device comprises ability to identify augmented reality triggers in reality sources; and selectively rendering one of the at least one portion of the standard digital content, the augmented reality digital content or the reality data captured by the at least one reality source relative to the at least one portion of the standard digital content, based on the rendering capability of the user device and the mixed content experience configuration.

In yet another embodiment, a non-transitory computer-readable storage medium for rendering augmented reality aware standard digital content is disclosed, which when executed by a computing device, cause the computing device to: detect, by a user device, a context sensitive trigger initiated in response to activation of a trigger condition related to a standard digital content; determine augmented reality content information associated with the context sensitive trigger using augmented reality awareness data; retrieve based on rendering capability of the user device and augmented reality content information, at least one of augmented reality trigger information, augmented reality digital content associated with the augmented reality trigger information mixed content experience configuration; activate at least one reality source based on the context sensitive trigger to capture reality data in response to retrieving the augmented reality content information, the augmented reality trigger information, and the mixed content experience configuration; identify, by the user device, at least one augmented reality trigger in the at least one reality source, when the rendering capability of the user device comprises ability to identify augmented reality triggers in reality sources; and selectively render, by the user device, one of the at least one portion of the standard digital content, the augmented reality digital content or the reality data captured by the at least one reality source relative to the at least one portion of the standard digital content, based on the rendering capability of the user device and the mixed content experience configuration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
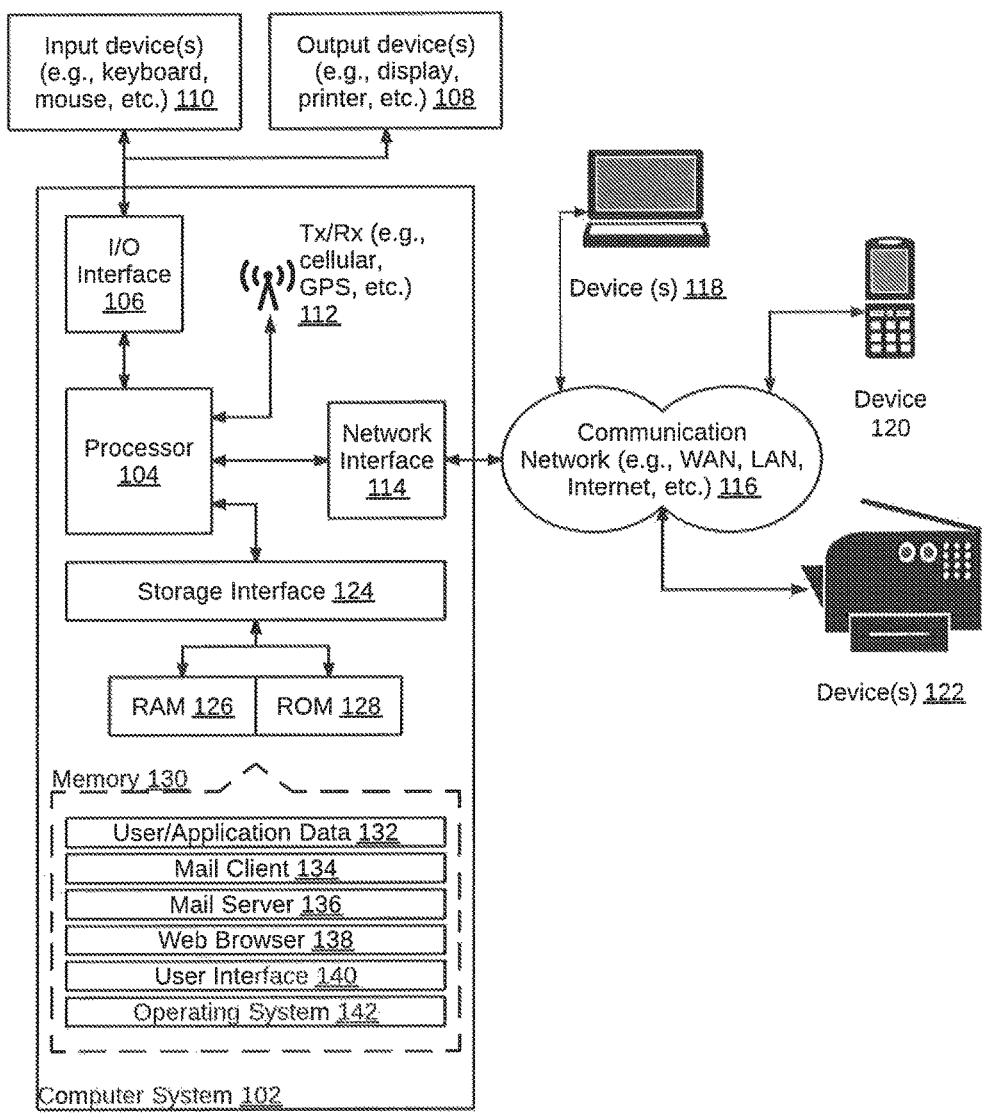
FIG. 1 illustrates a block diagram of an exemplary computer system for implementing various embodiments.

Additional illustrative embodiments are listed below. In one embodiment, a block diagram of an exemplary computer system for implementing various embodiments is disclosed in FIG. 1. Computer system 102 may comprise a central processing unit ("CPU" or "processor") 104. Processor 104 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. Processor 104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 104 may be disposed in communication with one or more input/output (I/O) devices via an I/O interface 106. I/O interface 106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 106, computer system 102 may communicate with one or more I/O devices. For example, an input device 108 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 110 may be a printer, fax machine, video display (e.g., cathode ray tube (CRT), liquid crystal display (LCD), light-emitting diode (LED), plasma, or the like), audio speaker, etc. In some embodiments, a transceiver 112 may be disposed in connection with processor 104. Transceiver 112 may facilitate various types of wireless transmission or reception. For example, transceiver 112 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor 104 may be disposed in communication with a communication network 114 via a network interface 116. Network interface 116 may communicate with communication network 114. Network interface 116 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 114 may include, without limitation, a direct interconnection, local area network (LAN), wide area network (WAN), wireless network (e.g., using Wireless Application Protocol), the Internet, etc. Using network interface 116 and communication network 114, computer system 102 may communicate with devices 118, 120, and 122. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 102 may itself embody one or more of these devices.

In some embodiments, processor 104 may be disposed in communication with one or more memory devices (e.g., RAM 126, ROM 128, etc.) via a storage interface 124. Storage interface 124 may connect to memory devices 130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 130 may store a collection of program or database components, including, without limitation, an operating system 132, a user interface application 134, a web browser 136, a mail server 138, a mail client 140, a user/application data 142 (e.g., any data variables or data records discussed in this disclosure), etc. Operating system 132 may facilitate resource management and operation of the computer system 102. Examples of operating system 132 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 134 may facilitate display, execution, interaction, manipulation, or operation of program components through textual or graphical facilities. For example, user interfaces may provide computer interaction interface elements on a display system operatively connected to computer system 102, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 102 may implement web browser 136 stored program component. Web browser 136 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 102 may implement mail server 138 stored program component. Mail server 138 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 102 may implement mail client 140 stored program component. Mail client 140 may be a mail viewing application, such as Apple Mail, Microsoft Entourage, Microsoft Outlook, Mozilla Thunderbird, etc.

In some embodiments, computer system 102 may store user/application data 142, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Figure 2:
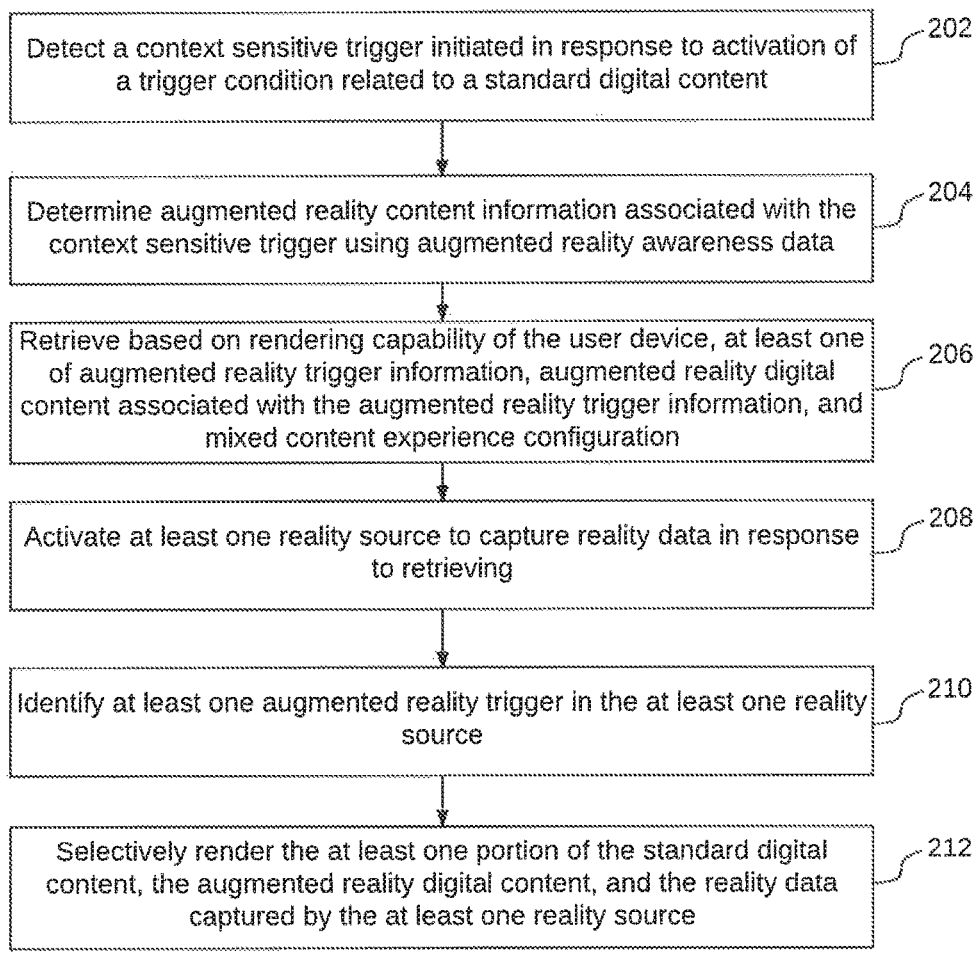
FIG. 2 illustrates a flowchart of a method of rendering augmented reality aware standard digital contents, in accordance with an embodiment.

FIG. 2 illustrates a flowchart of a method for rendering augmented reality aware standard digital contents, in accordance with an embodiment. To this end, first the augmented reality aware standard digital content is created and includes the standard digital content and augmented reality awareness metadata. Examples of standard digital content may include, but are not limited to e-books, PDF files, Notepad, images, Web pages, Microsoft Word document, audio content, 3D objects, virtual reality, animated content, and video content.

The augmented reality aware standard digital content is created, such that, if a user device does not have capability to render the augmented reality over the standard digital content, the user device will only display the standard digital content. In other words, the augmented reality aware standard digital content is not limited only to specialized user devices. As a result, creators and users of augmented reality aware standard digital content do not face an overhead of keeping multiple versions of standard digital content, with and without the augmented reality awareness built in. The same content can be used across user devices with different rendering capabilities.

The augmented reality aware standard digital content includes the standard digital content and augmented reality awareness metadata, which further includes augmented reality enablement information and details associated with the items include therein. The augmented reality awareness metadata may be made up of, but is not limited to files, databases or digital stores. It may be stored outside the standard digital content. Alternatively, at least a part of the augmented reality awareness metadata may be stored inside the standard digital content. In other words, it may be partially or full stored in the standard digital content.

The augmented reality enablement information is also a metadata that further includes details regarding association between context sensitive triggers and augmented reality content information. In other words, whenever a particular context sensitive trigger is detected, the augmented reality content information associated with that particular context sensitive trigger is retrieved. Thus, a context sensitive trigger that does not have an associated augmented reality content information, when detected, will not lead to any further action or result. In other words, such context sensitive triggers may be ignored. The augmented reality enablement information also includes details regarding turning on/off augmented reality awareness in a user device, when a particular context sensitive trigger is detected. In an exemplary embodiment, the augmented reality enablement information may be represented using table 1 given below:

TABLE 1

| Augmented Reality Enablement information ID | Context Sensitive Trigger (CST) ID | Augmented Reality Content (ARC) Information ID | AR awareness |
|---|---|---|---|
| ARE1 | CST1 | ARC1 | ON |
| ARE2 | CST2 | ARC1 | OFF |
| ARE3 | CST3 | ARC2 | ON |
| ARE4 | CST4 | ARC2 | OFF |

Thus, referring to table 1 given above, if context sensitive trigger: CST2 is detected, it is determined that ARC1 is the augmented reality content information that is associated with CST2. Additionally, it is also determined that whenever CST2 is detected, the augmented reality awareness needs to be turned off. Similarly, whenever CST4 is detected, augmented reality awareness is turned off. However, when CST1 and CST3 are detected, augmented reality awareness is turned on. This is further explained in detail below.

A context sensitive trigger may be detected by a user device based on activation of a trigger condition, which may include one or more of, but is not limited to user actions, user gestures, user profile, user preferences, ambient environment, device location, device orientation, content-flow actions, and device events comprising power saving mode, locked state, and user device sensor values. The context sensitive trigger corresponds to the context in which the trigger condition was activated. By way of an example, rendering frames in a video from time 2:00 to 2:15 seconds may act as a context sensitive trigger. By way of another example, second paragraph of fifth page in a document reaching top of a display in a user device may be a context sensitive trigger. In an exemplary embodiment, the context sensitive triggers may be represented using the table 2 given below:

TABLE 2

| Context Sensitive Trigger ID | Standard Digital Content ID | Context | Trigger Condition |
|---|---|---|---|
| CST1 | CID1 | Focus | Page 2 |
| CST2 | CID1 | Out of focus | Page 2 |
| CST3 | CID1 | Focus | Page 3, paragraph 5 |
| CST4 | CID1 | Out of focus | Page 3, paragraph 5 |
| CST5 | CID2 | Play started | Full video |
| CST6 | CID2 | Play stopped | Full video |
| CST7 | CID2 | Play reached | 2:00 to 2:30 seconds |

The augmented reality content information includes details regarding association of augmented reality triggers with augmented reality digital content and mixed content experience configuration. An augmented reality trigger may include, but is not limited to a marker, an object, temperature, time lapse, location, sensor values, and sound. An augmented reality digital content may include, but is not limited to 3D models, images, audio, video, animated content, virtual reality, and text. By way of an example, whenever a particular marker (augmented reality trigger) in the standard digital content or the reality source comes into view, an audio that is mapped to or associated with the marker, is played in the background. By way of another example, when a particular object is identified in a standard digital content or reality source, a video associated with that object is played. By way of yet another example, a beep may be played, whenever a particular temperature is reached while the user is interacting with a standard digital content. The temperature may be captured by temperature sensors (reality source) that may either be built inside the user device or may be located in vicinity of the user and is in communication with the user device. In an exemplary embodiment, augmented reality triggers may be represented using table 3 given below:

TABLE 3

| Augmented Reality Trigger ID | Type of Trigger | Trigger Value |
|---|---|---|
| ART1 | Marker | 5 |
| ART2 | Object | Wheel |
| ART3 | Temperature | >100 degree Celsius |
| ART4 | Time lapse | >60 seconds |
| ART5 | Location | 1 km around LatN, LongN |
| ART6 | Sound | >20 dB |

In this exemplary embodiment, for ART2: detection of a wheel (object) by a reality source (for example, a camera) is an indicator. Similarly, for ART3: detection by a temperature sensor (reality source) that surrounding temperature or temperature of the user device is greater than 100 degree Celsius acts an indicator. In an exemplary embodiment, association of augmented reality triggers with augmented reality digital content stored as the augmented reality content information be represented and stored as given in table 4 given below:

TABLE 4

| Augmented Reality Content information ID | Augmented Reality Trigger ID | Augmented reality Digital Content (ARDC) ID |
|---|---|---|
| ARC1 | ART1 | ARDC1 |
| ARC2 | ART1 | ARDC1 |
| ARC3 | ART2 | ARDC2 |
| ARC4 | ART2 | ARDC3 |

Augmented reality digital content also includes information regarding its relation/association with one or more portions of a standard digital content and may be represented as given in table 5 below, in an exemplary embodiment:

TABLE 5

| ARDC ID | Content ID | Content portion | Augmented Reality Experience action | Rotate | Translate | Scale |
|---|---|---|---|---|---|---|
| ARDC1 | CID1 | Page 2 | Overlay | 0, 0, 0 | 0, 45, 0 | 1, 1, 1 |
| ARDC2 | CID1 | Full document | Open full screen | | | |
| ARDC3 | CID2 | Page 3, paragraph 5 | Display popup | 60, 0, 0 | 120, 50, 0 | 0.5, 0.5, 05 |
| ARDC4 | CID2 | Page 3, paragraph 5 | Overlay | 0, 0, 90 | 0, 0, 245 | 1.25, 1.25, 1.25 |
| ARDC5 | CID3 | Full video | Play inline | 0, 50, 0 | 0, 355, 0 | 1.5, 1.5, 1.5 |
| ARDC6 | CID3 | Full video | Play full screen | | | |
| ARDC7 | CID4 | 2:00 to 2:30 seconds | Play inline | 0, 50, 0 | 0, 355, 0 | 1.5, 1.5, 1.5 |

Thus, for example, when the augmented reality digital content (with ARDC ID: ARDC3) is identified based on an associated augmented reality trigger, paragraph five of page three is displayed as a popup and orientation of the popup is further modified based on the detail as mentioned in the table above.

The rules governing which of: parts of standard digital content, augmented reality digital content relative to the parts of the standard digital content, and/or the reality data captured by a reality source, should be rendered on a user device, is stored as the mixed content experience configuration. In other words, the mixed content experience configuration defines what combination of standard digital content, augmented reality digital content, and the reality data has to be rendered. It defines the chain of events that leads to a final decision of rendering. This is further explained in detail below in steps 202 to 212. The reality source, for example, may include but is not limited to a camera, microphone, sensor values, and digital content. The senor values may be captured from multiple sensors that may include, but are not limited to pressure sensor, proximity sensor, ambient environment sensors, gyroscope, accelerometer, and compass. Examples of digital content may include, but are not limited to e-books, PDF files, Notepad, images, Web pages, Microsoft Word document, audio content, 3D objects, virtual reality, animated content, and video content.

After creating augmented reality aware standard digital content, when a user, is interacting, via a user device, with such a standard digital content that is augmented reality aware, the user device, at 202 may detect a context sensitive trigger that was initiated in response to activation of a trigger condition related to the standard digital content. The user device's detection of the context sensitive trigger would depend on rendering capability of the user device. Rendering capability of the user device includes ability to detect context sensitive and augmented reality triggers, render augmented reality digital content, and activate one or more reality sources in response to retrieving an augmented reality trigger.

If the user device does not have built-in ability to detect context sensitive triggers or does not have an application that can do so, the user device would merely open the standard digital content and would not detect that the content is augmented reality aware. Referring to table 2 provided above, for example, a user may be reading an e-book (CID1) on his/her tablet that has ability to detect context sensitive triggers. When the user focusses on page 2 of the e-book, a context sensitive trigger, i.e., CST1 would be detected. Had the tablet been a standard tablet, it would not have detected the context sensitive trigger.

Thereafter, at 204, based on the context sensitive trigger identified at 202, the user device determines the augmented reality content information that is associated with the context sensitive trigger using augmented reality awareness information, which includes record of such associations. At 206, based on the rendering capability of the user device and augmented reality content information, one or more of augmented reality trigger information, augmented reality digital content associated with the augmented reality trigger information, and mixed content experience configuration is retrieved.

Thus, when the user device has determined the augmented reality content information based on its mapping with the context sensitive trigger, it is used to identify which augmented reality trigger and augmented reality digital content are associated with each other. By way of an example, referring to table 4, ARC2 is determined at 204 due to its association with the context sensitive trigger detected at 202. The ARC 2 indicates that ART1 is associated with ARDC1. By way of another example, when ARC4 is determined at 204, association of ART 2 with ARDC3 is indicated. Additionally, mixed content experience configuration is also retrieved, which includes rules that enable the user device to make a decision on what kind and combination of content (standard digital content, augmented reality digital content, and/or reality data) needs to be rendered on the user device, while the user is interacting with the standard digital content. As a result, the user would be able to experience mixed content experience on the user device.

After retrieving, one or more reality sources are activated at 208 based on the context sensitive trigger. The one or more reality sources may capture reality data. Examples of the reality sources may include, but are not limited to a camera, microphone, sensor values, and digital content. The senor values may be captured from multiple sensors that may include, but are not limited to pressure sensor, proximity sensor, ambient environment sensors, gyroscope, accelerometer, and compass. Examples of digital content may include, but are not limited to e-books, PDF files, Notepad, images, Web pages, Microsoft Word document, audio content, 3D objects, virtual reality, animated content, and video content.

When in the augmented reality enablement information, the mapping of a context sensitive trigger and an augmented reality content information is associated with augmented reality awareness being turned on, one or more reality sources may be activated. Similarly, when such mapping is associated with augmented reality awareness being turned off, one or more reality sources may be deactivated. Referring to the table 1 of exemplary embodiment given above, mapping of CST1 with ARC1 is associated with augmented reality being turned on and mapping of CST2 with ARC1 is associated with augmented awareness being turned off. By way of an example, referring to table 1 and 2, when page 2 of CID1 is in focus, CST1 is detected by the user device. Thereafter, the user device determines that ARC1 is mapped to CST1 in table 1, and such mapping is associated with augmented awareness being turned on. Similarly, CST2's (page 2 of CID1 out of focus) mapping with ARC1 is associated with augmented awareness being turned off. Thus, in this scenario, whenever the page 2 of CID1 is in focus, a camera observing display of the user device and the user is turned on and whenever the page 2 is out of focus, the camera is turned off. For the time the camera is switched on, it captures reality data that includes information on user's interaction with display of the user device, when the page 2 was in focus.

Thereafter, at 210, the user device identifies one or more augmented reality trigger in the at least one reality source. The user device will only identify augmented reality trigger, when the rendering capability of the user device comprises ability to identify augmented reality triggers in reality sources. In case, the user device is an ordinary device, the user device will not be able to detect any augmented reality triggers. In continuation of the example given above and referring to table 3, when the camera is switched on and the page 2 is in view of the camera, it may identify a wheel drawn on the page 3 and thus the augmented reality trigger ART2 (given in table 3) is identified.

At 212, the user device selectively renders one of one or more portions of the standard digital content, the augmented reality digital content and the reality data captured by the one or more reality sources relative to the one or more portions of the standard digital content. The selective rendering is performed based on the mixed content experience configuration.

In continuation of the example given above, when ART2 given in table 3 is identified, it is further determined that ART2 is associated or mapped to ARDC2 as given in table 4. Thus, when the camera detects a wheel on page 2 of CID1, ART2 is identified and that further leads to the conclusion that ARDC2 needs to be rendered on the user device. Referring now to table 5 given above, rendering ARDC2 translates to opening the complete document for CID1 in full screen on the user device. This chain of events, starting with opening of the standard digital content (that is augmented reality aware) till opening of the complete document for CID1 in full screen is one of rules built in the mixed content experience configuration.

By way of another example, when a document is being displayed on the user device and when a specific page comes into view, the augmented reality awareness is turned on by opening camera. Thereafter, based on what is seen by the camera, additional information/overlay inline in that page/on a separate page may be displayed. By way of yet another example, a part of a huge video (for instance from time 2:00 to 2:15 seconds) may be retrieved and displayed on the user device, when a particular object is found in a camera frame.

The selective rendering on the user device also depends on the rendering capability of the user device. In other words, if the user device is merely capable of rendering standard digital content, it will only render the standard digital content on the user device. If the user device also has the ability to render augmented reality digital content, the user device would render the augmented reality digital content in relation to the standard digital content. However, it won't be able to activate reality sources and thus won't render augmented reality digital content relative to the standard digital content based on the reality data captured by the reality sources.

By way of an example, when an augmented reality aware PDF document is opened using a normal PDF reader on the user device, the PDF document gets displayed as regular PDF document without augmented reality awareness. However, when the same document is opened using an augmented reality aware PDF reader on the user device, additional augmented reality aware features are rendered as well.

Thus, augmented reality aware standard digital content that provides an immersive mixed content experience is rendered to a user based on a usage context (purpose) and dynamically selected portions of a standard digital content based on the usage context. Augmented reality and non-augmented reality content that may superimpose or replace existing non-augmented reality content is provided, which enables supplementing skills of a maintenance personnel. Moreover, all the reality inputs of augmented reality experience are considered to achieve this.

Figure 3:
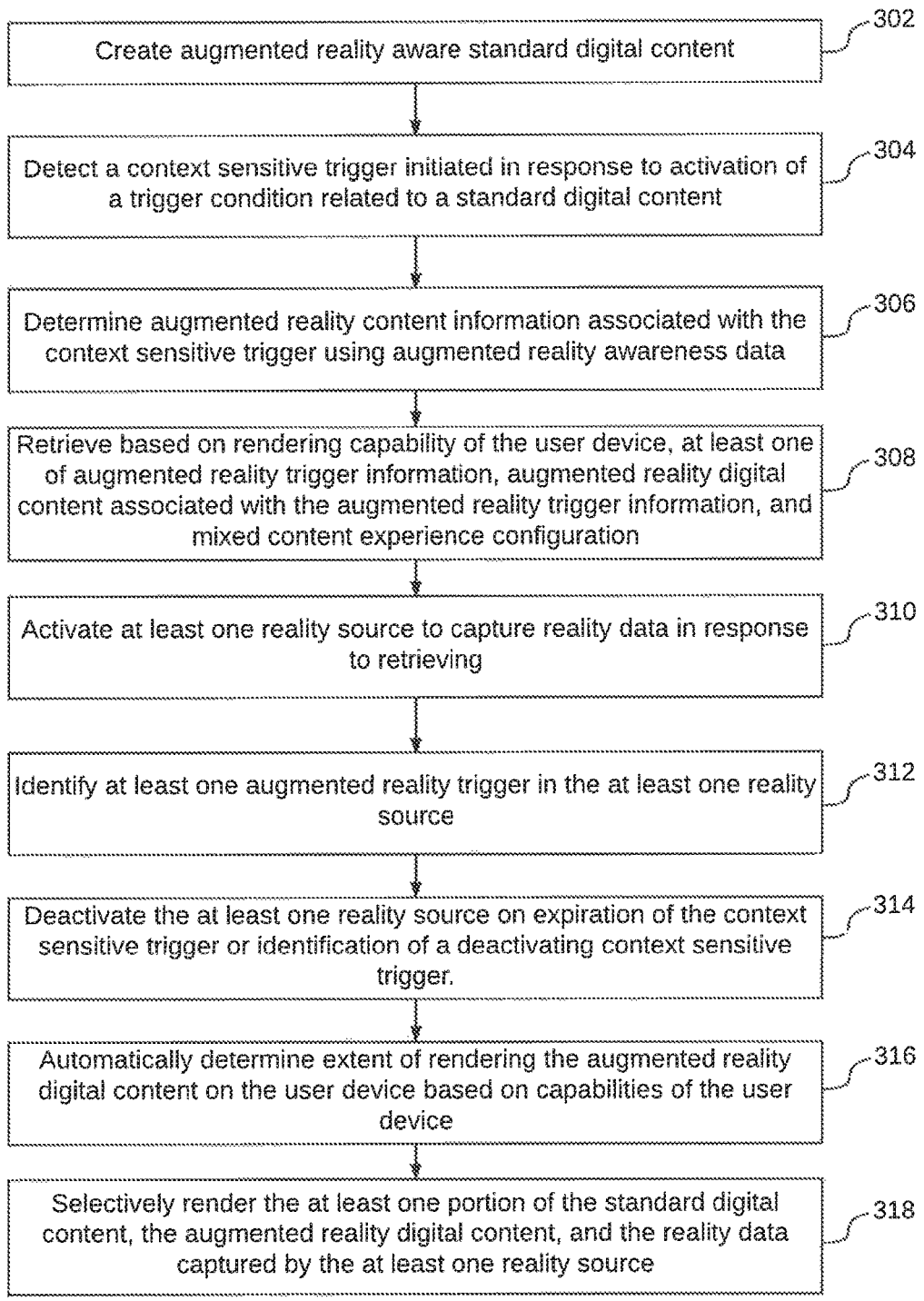
FIG. 3 illustrates a flowchart of a method of rendering augmented reality aware standard digital contents, in accordance with another embodiment.

FIG. 3 illustrates a flowchart of a method for rendering augmented reality aware standard digital contents, in accordance with another embodiment. At 302, augmented reality aware standard digital content is created. This has been explained in detail in conjunction with FIG. 2. While creating the augmented reality aware standard digital content, both the complete augmented reality awareness and augmented reality digital content may be configured inline inside the standard digital content. Alternatively, the augmented reality digital content may be configured outside the standard digital content but augmented reality awareness may be configured inline inside the standard digital content. In another scenario, both the complete augmented reality awareness and augmented reality digital content may be configured outside of the standard digital content.

Thereafter, at 304, a context sensitive trigger that is initiated in response to activation of a trigger condition related to a standard digital content is detected. At 306, augmented reality content information associated with the context sensitive trigger is determined using augmented reality awareness data. Based on the augmented reality content information and rendering capability of the user device, one or more of augmented reality trigger information, augmented reality digital content associated with the augmented reality trigger information, and mixed content experience configuration are retrieved at 308. This has been explained in detail in conjunction with FIG. 2.

Thereafter, at 310, one or more reality sources are activated based on the context sensitive trigger to capture reality data in response to retrieving at 308. At 312, one or more augmented reality triggers are identified in the one or more reality sources. This has been explained in detail in conjunction with FIG. 2. At 314, the one or more reality sources are deactivated on expiration of the context sensitive trigger or on identification of a deactivating context sensitive trigger. In other words, augmented reality awareness may be turned on or off. By way of an example, when page 3 of a standard digital content comes into view, the object detection engine may be turned on and when the page 5 goes out of view, the object detection engine may be turned off. By way of another example, while frames from 3:00 to 3:20 seconds are being rendered, a noise detection engine may be turned on and when the user clicks on pause button of the video, the noise detection engine may be turned off.

The selection of augmented reality engines is also influenced by multiple factors that may include, but are not limited to user preferences, augmented reality digital content, augmented reality awareness content and capabilities of the user device. By way of an example, page 2 in a PDF file may have a marker that is intended to turn on augmented reality in order to find out the name of a building. In this case, running only the Optical character recognition (OCR) sub-engine might be faster and thus may be executed to save time and resources.

At 316, the user device, automatically determines the extent of rendering the augmented reality digital content on the user device based on capabilities of the user device. In an embodiment, capabilities of the user device are queried to decide on suitable extent of rendering. The capabilities may include, but are not limited to processing power, available memory, display size, remaining battery, and communication speed. These capabilities of the user device are used in various decision factors considered by augmented reality aware contents renderer. These decision factor may include, but are not limited to selection of suitable augmented reality engines, selection of augmentation objects, and selection of quality of augmentation.

By way of an example, a user device having 2 Ghz processor speed may run X augmented reality engine, whereas a user device having 1 GHz processor can run a Y augmented reality engine. The capabilities of X augmented reality engine are superior to that of Y augmented reality engine. By way of another example, a user device may have a hardware accelerated 3D engine, whereas another user device may not have the hardware accelerated 3D engine. Thus, the decision would be made not to display 3D augmentations on the user device that does not have the hardware accelerated 3D engine.

Thereafter, at 316, the use device selectively renders one of the one or more portions of the standard digital content, the augmented reality digital content, and the reality data captured by the one or more reality sources. This has been explained in detail in conjunction with FIG. 2.

Figure 4:
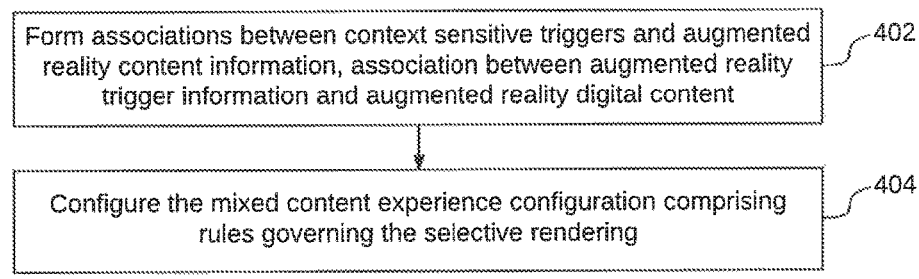
FIG. 4 illustrates a flowchart of a method of creating augmented reality aware standard digital contents, in accordance with an embodiment.

FIG. 4 illustrates a flowchart of a method for creating augmented reality aware standard digital content, in accordance with an embodiment. At 402, associations between context sensitive triggers and augmented reality content information and association between augmented reality trigger information and augmented reality digital content is formed. Thereafter, at 404, the mixed content experience configuration that includes rules governing the selective rendering are configured. This has been explained in detail in conjunction with FIG. 2.

Figure 5:
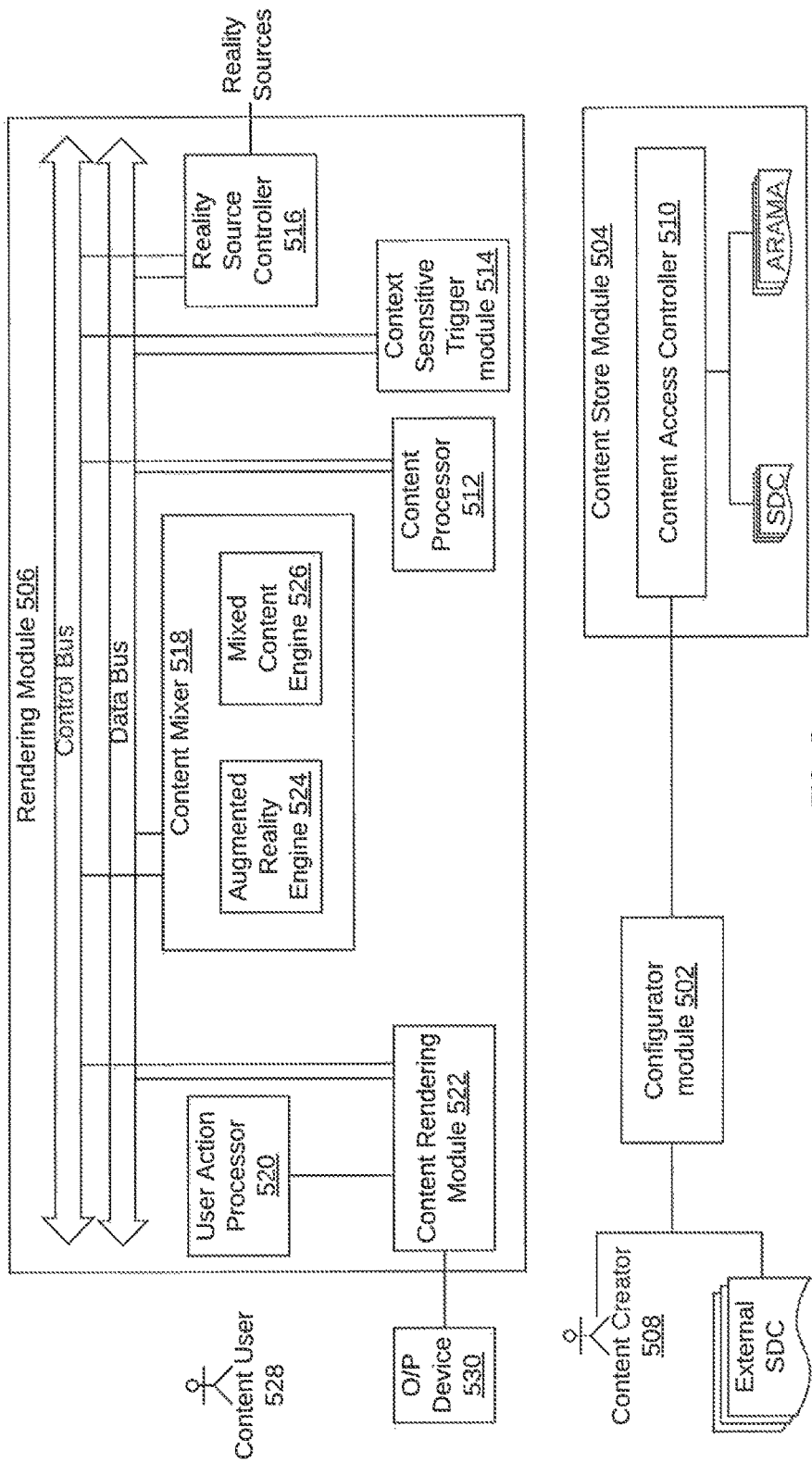
FIG. 5 is a block diagram illustrating a system of rendering augmented reality aware contents, in accordance with an embodiment.

FIG. 5 is a block diagram illustrating an augmented reality rendering system 500 for rendering augmented reality aware standard digital contents, in accordance with an embodiment. Augmented reality rendering system 500 includes a configurator module 502, a content store module 504, and a rendering module 506.

Configurator module 502 is used by a content creator 508 to create and configure augmented reality aware standard digital content using external standard digital content that is fed into configurator module 502. Configurator module 502 stores and retrieves standard digital content and Augmented Reality Aware Metadata (ARAMA) information from/to a content access controller 510 in content store module 504 that stores, manages provides augmented reality aware standard digital content to rendering module 506. To enable this, control access controller 510 communicates with a content processor 512 in rendering module 506. Content processor 512 then makes this data available to various modules and components in rendering module 506. The creation and configuration of augmented reality aware standard digital content has been explained in detail in conjunction with FIG. 2.

The rendering module 506 further includes a context sensitive trigger module 514, a reality source controller 516, a content mixer 518, a user action processor 520, and a content rendering module 522. Context sensitive trigger module 514 receives context inputs from other modules and components within rendering module 506. It analyzes and generates context sensitive triggers and makes them available to other modules and components. Context sensitive triggers have been explained in conjunction with FIG. 2.

Reality source controller 516 receives reality data captured by the reality sources. Examples of reality sources may include but are not limited to a camera, sensor values, and digital content. The reality data may come from the same device and/or other external sources and environments. The content captured or generated by content processor 512, context sensitive trigger module 514, and reality source controller 516 is communicated to content mixer 518.

Content mixer 518 that includes an augmented reality engine 524 and a mixed content engine 526, uses these engines to mix the content received and sends the mixed content to content rendering module 522. In addition to receiving the mixed content, content rendering module 522 receives inputs from user action processor 520 that receives inputs from a content user 528. Based on the received information, content rendering module 522 selectively renders received contents on output devices 530, which are then consumed by content user 528. This has been explained in detail in conjunction with FIG. 2.

Various embodiments of the invention provide systems and methods for augmented reality aware contents. Augmented reality aware standard digital content that provides an immersive mixed content experience is rendered to a user based on a usage context (purpose) and dynamically selected portions of a standard digital content based on the usage context. Augmented reality and non-augmented reality content that may superimpose or replace existing non-augmented reality content is provided, which enables supplementing skills of a maintenance personnel. Moreover, all the reality inputs of augmented reality experience are considered to achieve this.

The specification has described systems and methods for augmented reality aware contents. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor ay be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of rendering augmented reality aware standard digital content, the method comprising:

detecting, by a user device, a context sensitive trigger initiated in response to activation of a trigger condition related to a standard digital content;

determining augmented reality content information associated with the context sensitive trigger using augmented reality awareness data;

retrieving based on rendering capability of the user device and augmented reality content information, at least one of augmented reality trigger information, augmented reality digital content associated with the augmented reality trigger information or mixed content experience configuration, wherein the mixed content experience configuration is indicative of what kind and combination of the standard digital content, the augmented reality digital content, and reality data has to be rendered;

activating at least one reality source based on the context sensitive trigger to capture reality data in response to retrieving the augmented reality content information, the augmented reality trigger information, and the mixed content experience configuration;

identifying, by the user device, at least one augmented reality trigger in the at least one reality source, when the rendering capability of the user device comprises ability to identify augmented reality triggers in reality sources;

selectively rendering, by the user device, a particular combination of the at least one portion of the standard digital content, the augmented reality digital content and the reality data captured by the at least one reality source relative to the at least one portion of the standard digital content, based on the rendering capability of the user device and the mixed content experience configuration, wherein based on the rendering capability of the user device, determining one or more decision factors comprising a selection of one or more augmented reality engines, selection of one or more augmentation objects, and selection of quality of augmentation; and automatically determining, by the user device, an extent of rendering the particular combination of the at least one portion of the standard digital content, the augmented reality digital content and the reality data relative to the at least one portion of the standard digital content on the user device based on the determined one or more decision factors.

2. The method of claim 1, wherein the trigger condition for the context sensitive trigger comprises at least one of user actions, user gestures, user profile, user preferences, ambient environment, device location, device orientation, content-flow actions or device events comprising power saving mode, locked state, and user device sensor values.

3. The method of claim 1, wherein the standard digital content comprises at least one of e-books, PDF files, Notepad, images, Web pages, Microsoft Word document, audio content, 3D objects, virtual reality, animated content or video content.

4. The method of claim 1, wherein the context sensitive trigger corresponds to the context in which the trigger condition was activated, the content sensitive trigger indicates enablement or disablement of an augmented reality digital content.

5. The method of claim 1 further comprising rendering the at least one portion of the standard digital content on the user device based on the rendering capability of the user device.

6. The method of claim 1 further comprising rendering the at least one portion of the standard digital content and the augmented reality digital content on the user device based on the rendering capability of the user device, wherein the augmented reality digital content is overlaid on the standard digital content.

7. The method of claim 1, wherein the at least one reality source comprises a camera, sensor values, and digital content.

8. The method of claim 1, wherein the augmented reality trigger comprises at least one of a marker, an object, temperature, time lapse, location, sensor values or sound.

9. The method of claim 1 further comprising creating the augmented reality aware standard digital content, creating comprising:
forming associations between context sensitive triggers and augmented reality content information, association between augmented reality trigger information and augmented reality digital content; and
configuring the mixed content experience configuration comprising rules governing the selective rendering of at least one of the at least one portion of the standard digital content, the augmented reality digital content relative to the at least one portion of the standard digital content or the reality data captured by the at least one reality source.

10. The method of claim 1 further comprising deactivating the at least one reality source on expiration of the context sensitive trigger or identification of a deactivating context sensitive trigger.

11. The method of claim 1, wherein the rendering capability of the user device comprises ability to: detect context sensitive triggers, detect augmented reality triggers, render augmented reality digital content, and activate the at least one reality source in response to retrieving an augmented reality trigger.

12. A system for rendering augmented reality aware standard digital content, the system comprising:
at least one processors; and
a computer-readable medium storing instructions that, when executed by the at least one processor, cause the at least one processor to perform operations comprising:
detect a context sensitive trigger initiated in response to activation of a trigger condition related to a standard digital content;
determine augmented reality content information associated with the context sensitive trigger using augmented reality awareness data;
retrieve based on rendering capability of the user device and augmented reality content information, at least one of augmented reality trigger information, augmented reality digital content associated with the augmented reality trigger information or mixed content experience configuration, wherein the mixed content experience configuration is indicative of what kind and combination of the standard digital content, the augmented reality digital content, and reality data has to be rendered;
activate at least one reality source based on the context sensitive trigger to capture reality data in response to retrieving the augmented reality content information, the augmented reality trigger information, and the mixed content experience configuration;
identify at least one augmented reality trigger in the at least one reality source, when the rendering capability of the user device comprises ability to identify augmented reality triggers in reality sources;
selectively render a particular combination of the at least one portion of the standard digital content, the augmented reality digital content and the reality data captured by the at least one reality source relative to the at least one portion of the standard digital content, based on the rendering capability of the user device and the mixed content experience configuration, wherein based on the rendering capability of the user device, determining one or more decision factors comprising a selection of one or more augmented reality engines, selection of one or more augmentation objects, and selection of quality of augmentation; and
automatically determine an extent of rendering the particular combination of the at least one portion of the standard digital content, the augmented reality digital content and the reality data relative to the at least one portion of the standard digital content on the user device based on the determined one or more decision factors.

13. The system of claim 12, wherein the trigger condition for the context sensitive trigger comprises at least one of user actions, user gestures, user profile, user preferences, ambient environment, device location, device orientation, content-flow actions or device events comprising power saving mode, locked state, and user device sensor values.

14. The system of claim 12, wherein the operations further comprise rendering the at least one portion of the standard digital content on the user device based on the rendering capability of the user device.

15. The system of claim 12, wherein the operations further comprise rendering the at least one portion of the standard digital content and the augmented reality digital content on the user device based on the rendering capability of the user device, wherein the augmented reality digital content is overlaid on the standard digital content.

16. The system of claim 12, wherein the operations further comprise creating the augmented reality aware standard digital content, creating further comprises operations of:
    forming associations between context sensitive triggers and augmented reality content information, association between augmented reality trigger information and augmented reality digital content; and
    configuring the mixed content experience configuration comprising rules governing the selective rendering of at least one of the at least one portion of the standard digital content, the augmented reality digital content relative to the at least one portion of the standard digital content or the reality data captured by the at least one reality source.

17. The system of claim 12, wherein the operations further comprise deactivating the at least one reality source on expiration of the context sensitive trigger or identification of a deactivating context sensitive trigger.

18. A non-transitory computer-readable storage medium for rendering augmented reality aware standard digital content, when executed by a computing device, cause the computing device to:
    detect, by a user device, a context sensitive trigger initiated in response to activation of a trigger condition related to a standard digital content;
    determine augmented reality content information associated with the context sensitive trigger using augmented reality awareness data;
    retrieve based on rendering capability of the user device and augmented reality content information, at least one of augmented reality trigger information, augmented reality digital content associated with the augmented reality trigger information or mixed content experience configuration, wherein the mixed content experience configuration is indicative of what kind and combination of the standard digital content, the augmented reality digital content, and reality data has to be rendered;
    activate at least one reality source based on the context sensitive trigger to capture reality data in response to retrieving the augmented reality content information, the augmented reality trigger information, and the mixed content experience configuration;
    identify, by the user device, at least one augmented reality trigger in the at least one reality source, when the rendering capability of the user device comprises ability to identify augmented reality triggers in reality sources;
    selectively render, by the user device, a particular combination of the at least one portion of the standard digital content, the augmented reality digital content and the reality data captured by the at least one reality source relative to the at least one portion of the standard digital content, based on the rendering capability of the user device and the mixed content experience configuration, wherein based on the rendering capability of the user device, determining one or more decision factors comprising a selection of one or more augmented reality engines, selection of one or more augmentation objects, and selection of quality of augmentation; and
    automatically determine, by the user device, an extent of rendering the particular combination of the at least one portion of the standard digital content, the augmented reality digital content and the reality data relative to the at least one portion of the standard digital content on the user device based on the determined one or more decision factors.

* * * * *